(12) United States Patent
Huang et al.

(10) Patent No.: US 11,319,155 B2
(45) Date of Patent: May 3, 2022

(54) SORTING SYSTEM FOR CONVEYING APPARATUS

(71) Applicant: USUN TECHNOLOGY CO., LTD., Taoyuan (TW)

(72) Inventors: Chiu-Fong Huang, Taoyuan (TW); Hsiang-Yueh Yu, Taoyuan (TW)

(73) Assignee: USUN TECHNOLOGY CO., LTD., Taoyuan (TW)

( * ) Notice: Subject to any disclaimer, the term of this patent is extended or adjusted under 35 U.S.C. 154(b) by 0 days.

(21) Appl. No.: 17/171,611

(22) Filed: Feb. 9, 2021

(65) Prior Publication Data

US 2021/0269245 A1 Sep. 2, 2021

(30) Foreign Application Priority Data

Feb. 27, 2020 (TW) ................. 109106540

(51) Int. Cl.
| | | |
|---|---|---|
| *B65G 13/10* | (2006.01) | |
| *B65G 13/06* | (2006.01) | |
| *B65G 47/46* | (2006.01) | |
| *B65G 47/54* | (2006.01) | |
| *B65G 47/64* | (2006.01) | |

(52) U.S. Cl.
CPC ........... *B65G 13/10* (2013.01); *B65G 13/065* (2013.01); *B65G 47/46* (2013.01); *B65G 47/54* (2013.01); *B65G 47/648* (2013.01); *B65G 2207/18* (2013.01)

(58) Field of Classification Search
CPC ...... B65G 13/10; B65G 13/065; B65G 47/46; B65G 2207/18; B65G 47/648; B65G 47/53; B65G 47/54
See application file for complete search history.

(56) References Cited

U.S. PATENT DOCUMENTS

| | | | | |
|---|---|---|---|---|
| 4,589,542 A | * | 5/1986 | Steadman ................ | B64D 9/00 198/782 |
| 5,577,596 A | * | 11/1996 | Van Essen ................ | B07C 3/02 198/349 |
| 9,499,341 B2 | * | 11/2016 | Wilkins .................. | B65G 47/71 |
| 9,878,856 B2 | * | 1/2018 | Specht ................... | B65G 13/02 |
| 10,843,872 B2 | * | 11/2020 | Guglielmi ............... | B65G 13/10 |
| 11,008,175 B1 | * | 5/2021 | Watts ..................... | F16M 11/18 |

(Continued)

*Primary Examiner* — Mark A Deuble
(74) *Attorney, Agent, or Firm* — Muncy, Geissler, Olds & Lowe, P.C.

(57) ABSTRACT

A sorting system for a conveying apparatus is disclosed. A conveying platform of the conveying apparatus includes turning driving devices disposed side by side at a branching position on the article conveying path, and each turning driving device includes a directional motor, and a wheel hub motor module and a driving device disposed above and below the directional motor, respectively. When the article conveyed by the conveying platform enters the branching position, a control module outputs and transmits control signals to the directional motors and the wheel hub motor modules, and a rotation shaft drives a fixing frame of the wheel hub motor module to horizontally turn to a preset angular position, and the wheel hub motor module drives a roller to vertically rotate to drive the article to convey to a predetermined position along a preset path, so that a sorting operation can be completed quickly.

3 Claims, 12 Drawing Sheets

(56) References Cited

U.S. PATENT DOCUMENTS

| | | | |
|---|---|---|---|
| 2008/0169171 A1* | 7/2008 | Itoh | B65G 13/10 198/412 |
| 2016/0145053 A1* | 5/2016 | Vetter | B65G 47/52 198/401 |
| 2017/0121124 A1* | 5/2017 | Wilkins | B65G 13/065 |
| 2018/0111767 A1* | 4/2018 | Itoh | B65G 47/244 |

* cited by examiner

SORTING SYSTEM FOR CONVEYING APPARATUS

This application claims the priority benefit of Taiwan patent application number 109106540, filed on Feb. 27, 2020.

BACKGROUND OF THE INVENTION

1. Field of the Invention

The present invention provides a sorting system for a conveying apparatus, more particularly to a sorting system using turning driving devices disposed on a branching position of a conveying platform to sort articles.

2. Description of the Related Art

In recent years, the existing sorting system used in the conveying apparatus is located at the turning point or branching point of an article conveying platform, and the sorting system can guide articles to predetermined positions based on predetermined paths or quickly sort the articles, and the conventional sorting methods can be divided into a forced-turning sorting method, a linked-roller sorting method and a differential-roller sorting method.

In the forced-turning sorting method, traditionally, a pendulum plate is used to force the article to move toward the desired conveying platform when an article is conveyed to the branching point on the conveying platform. However, the forced-turning sorting method is hard to be used in the current era of unmanned factories with automated productions because the conveyed article easily hits the side of the conveying platform during conveying process. The forced-turning sorting method is generally used in the conveying apparatus for conveying trunks or package boxes. Therefore, this sorting system using the forced-turning sorting method is only used for the article which is hard to be permanently broken or damaged, and when the sequentially-conveyed articles are stuck in the turning position of the conveying platform, the conveying apparatus in operation may be stuck, unable to move and then stopped, and it even causes damage to the conveying apparatus or articles and results in huge loss. It can be understood that if the machine of an unmanned factory is shut down and cannot be used, it will cause serious loss of tangible or intangible resources.

The second sorting method is the linked-roller sorting method. The sorting system using linked-roller sorting method includes multiple rows of linked roller modules, and a complex linkage structure is used to pull the linked roller modules to horizontally rotate and respectively swing toward different angles at the same time, and a plurality of transmission shafts are respectively disposed between the adjacent two of the roller modules, and the transmission shafts are driven by motor belts. The outer surface of each transmission shaft is abutted between the adjacent two linked roller modules, and when an article is at the tuning point or branching point of the conveying platform, the article contacts the linked roller modules and turns, and the transmission shaft is used to link the rollers of the adjacent roller modules to rotate, to drive movement of the article, so that the articles are moved towards the specific conveying direction of the branch on the conveying platform. It can be understood that when the linked-roller sorting method is applied to the conveying apparatus having the branch path with an excessive angle or with an angle close to 90 degrees, the transmission shaft is unable to rotate to a large angle because the transmission shaft contacts the adjacent linked rollers at the same time, so usage of the linked-roller sorting method is limited by the turning angle and the conveyor apparatus using the linked-roller sorting method requires more installation space to solve above-mentioned problem. Furthermore, the overall structural design complexity of above-mentioned scheme is quite high, and when the linked-roller sorting method is applied to different conveying apparatus with different shape or different numbers of branch paths, the acting structures and linkage type of all roller modules must be redesigned, and the drive control program is complicated and not simple, and the overall maintenance of the system is difficult, the system is difficult to assemble and has high cost, and sharing the roller module in the system is not possible.

In the differential-roller sorting method, each module has three roller assemblies and use motors to drive the rollers configured in an inverted-Y arrangement to generate differential motion, that is, the power rollers in three different directions are driven to vertically rotate in different directions and speeds, to turn the article horizontally and move the article toward different directions at the same time, so that the article is moved toward a specific branching direction on the conveying platform. In this way, when the article is conveyed to the branching point on the conveying platform, each set of differential rollers must determine a matching state of the rotation speeds of the differential rollers according to the variable factors such as the weight, friction coefficient, shape and size of the article. If the article is too heavy, the conveying speed is slow because the single differential roller module is unable to turn horizontally, and it results in longer action time and slower conveying speed, which are not conducive to the conveying apparatus for mass fast production. Furthermore, the overall structure of the differential roller module is complex and the drive control program is complicated and not streamlined, and when being used on different conveying apparatus, the differential roller must continuously rotate forwardly or reversely according to the actual situation, and such operation may cause damage and high maintenance cost of the roller, and the application scope of this method is also limited.

It can be understood that the aforementioned three existing sorting methods for the conveying apparatus need extremely precise control and adjustment in the conveying path planning for different articles to be conveyed. However, under the current unmanned automated production mode which require simple and fast process, the sorting system must be simple, reliable, fast, easy to repair, not easy to damage and also have low cost to meet requirements of the current unmanned automated production, and the sorting system also must be not easy to cause damage to the conveyed article, the conveying apparatus or machine. Therefore, in the era of unmanned factory with automated production, how to develop a sorting system which can be easily applied to different conveying apparatus, or can be repaired, maintained or replaced completely in a very short time, is a key issue in the industry.

SUMMARY OF THE INVENTION

In order to solve the conventional technical problem, the inventors develop a sorting system for a conveying apparatus according to collected data, multiple tests and modifications, and years of experience in the industry.

An objective of the present invention is to dispose turning driving devices side by side at a branching position on an article conveying path in a conveying platform, and when an article enters the branching position, a driving device of each turning driving device outputs and transmits control signals to a directional motor and a wheel hub motor module, respectively, so that a rotation shaft of the directional motor drives a fixing frame of the wheel hub motor module to horizontally turn to a preset angular position, and the wheel hub motor module drives a roller to vertically rotate to drive the article, which is placed on the roller, to convey along the preset path, thereby completing quickly a sorting operation. The directional motors of the turning driving devices are able to individually drive the wheel hub motor modules to horizontally turn, and the wheel hub motor modules drive the rollers to directly output power, to guide the article to quickly move toward the predetermined convey direction, thereby achieving the effect of simple structure, small assembly space and low cost.

Another objective of the present invention is that in the detaching or repairing operation for one of the turning driving devices on the conveying platform (for example, the motor is abnormal), the operator just needs to downwardly or upwardly detach a quick release motor housing, which covers the directional motor and the wheel hub motor module, to quick detach the directional motor, the wheel hub motor module and the driving device together, or the operator can install another turning driving device which functions well. In this way, the turning driving device can be designed as a single modularized installation kit for quick detachment or replacement, so that the period of stopping or interrupting the production line to repair can be greatly shortened, and the present invention can achieve the effect of quick assembly and easy maintenance.

BRIEF DESCRIPTION OF THE DRAWINGS

The structure, operating principle and effects of the present invention will be described in detail by way of various embodiments which are illustrated in the accompanying drawings.

DETAILED DESCRIPTION OF THE PREFERRED EMBODIMENTS

The following embodiments of the present invention are herein described in detail with reference to the accompanying drawings. These drawings show specific examples of the embodiments of the present invention. These embodiments are provided so that this disclosure will be thorough and complete, and will fully convey the scope of the invention to those skilled in the art. It is to be acknowledged that these embodiments are exemplary implementations and are not to be construed as limiting the scope of the present invention in any way. Further modifications to the disclosed embodiments, as well as other embodiments, are also included within the scope of the appended claims.

These embodiments are provided so that this disclosure is thorough and complete, and fully conveys the inventive concept to those skilled in the art. Regarding the drawings, the relative proportions and ratios of elements in the drawings may be exaggerated or diminished in size for the sake of clarity and convenience. Such arbitrary proportions are only illustrative and not limiting in any way. The same reference numbers are used in the drawings and description to refer to the same or like parts. As used herein, the singular forms "a", "an" and "the" are intended to include the plural forms as well, unless the context clearly indicates otherwise.

It is to be acknowledged that, although the terms 'first'. 'second', 'third', and so on, may be used herein to describe various elements, these elements should not be limited by these terms. These terms are used only for the purpose of distinguishing one component from another component. Thus, a first element discussed herein could be termed a second element without altering the description of the present disclosure. As used herein, the term "or" includes any and all combinations of one or more of the associated listed items.

It will be acknowledged that when an element or layer is referred to as being "on," "connected to" or "coupled to" another element or layer, it can be directly on, connected or coupled to the other element or layer, or intervening elements or layers may be present. In contrast, when an element is referred to as being "directly on," "directly connected to" or "directly coupled to" another element or layer, there are no intervening elements or layers present.

In addition, unless explicitly described to the contrary, the words "comprise" and "include", and variations such as "comprises". "comprising", "includes", or "including" will be acknowledged to imply the inclusion of stated elements but not the exclusion of any other elements.

Figure 1:
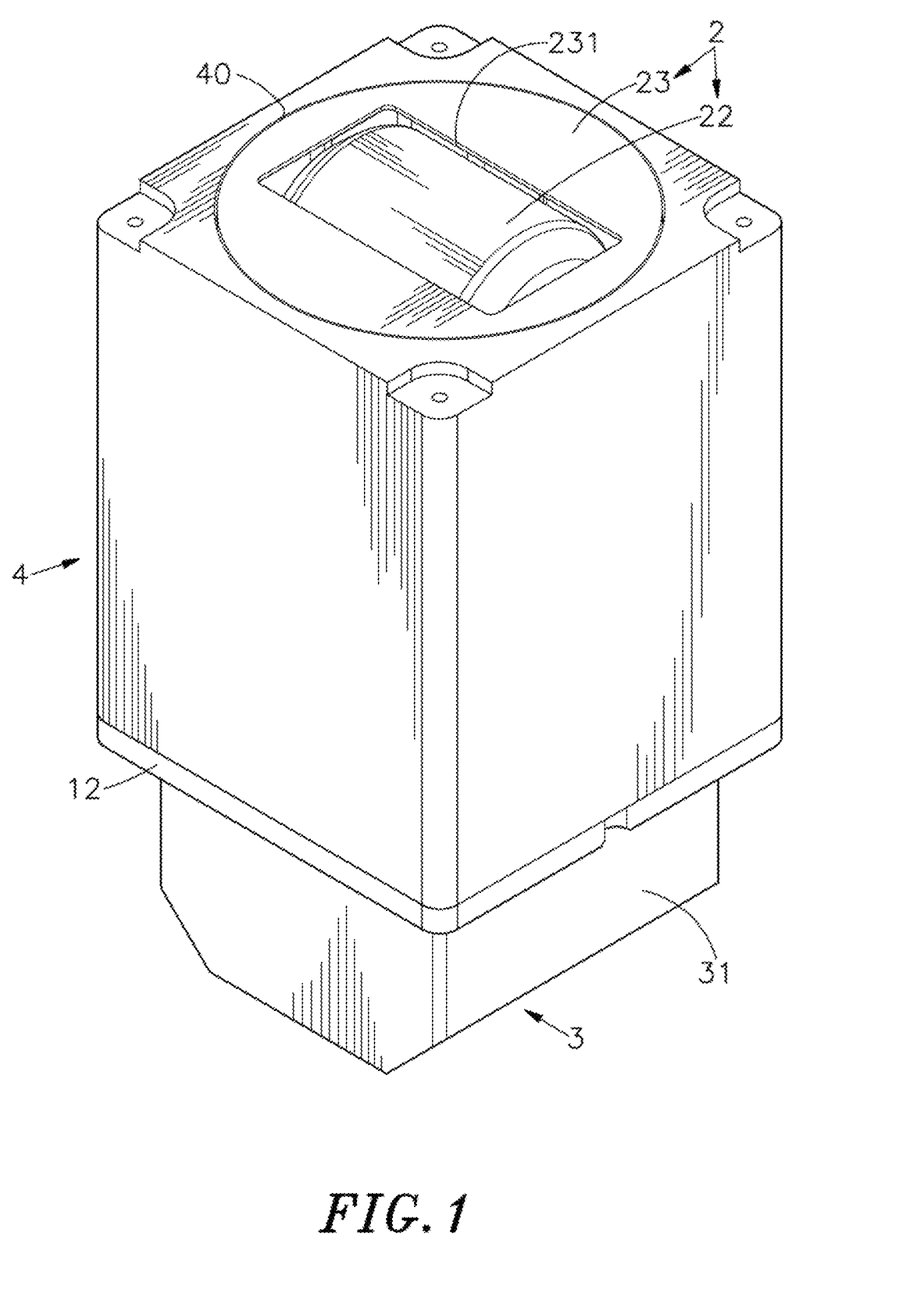
FIG. 1 is a perspective view of a turning driving device of the present invention.
Figure 2:
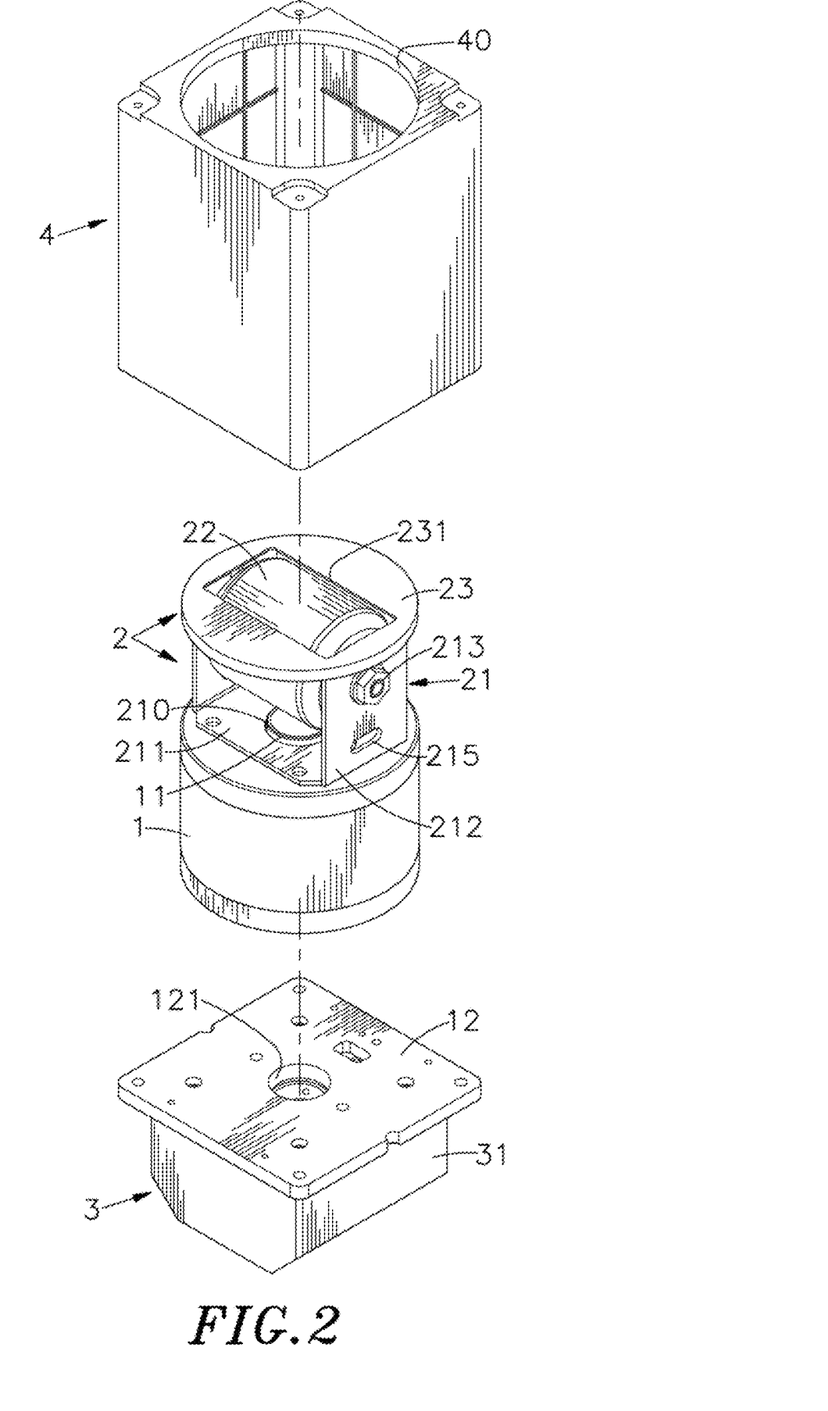
FIG. 2 is a perspective exploded view of a turning driving device of the present invention.
Figure 3:
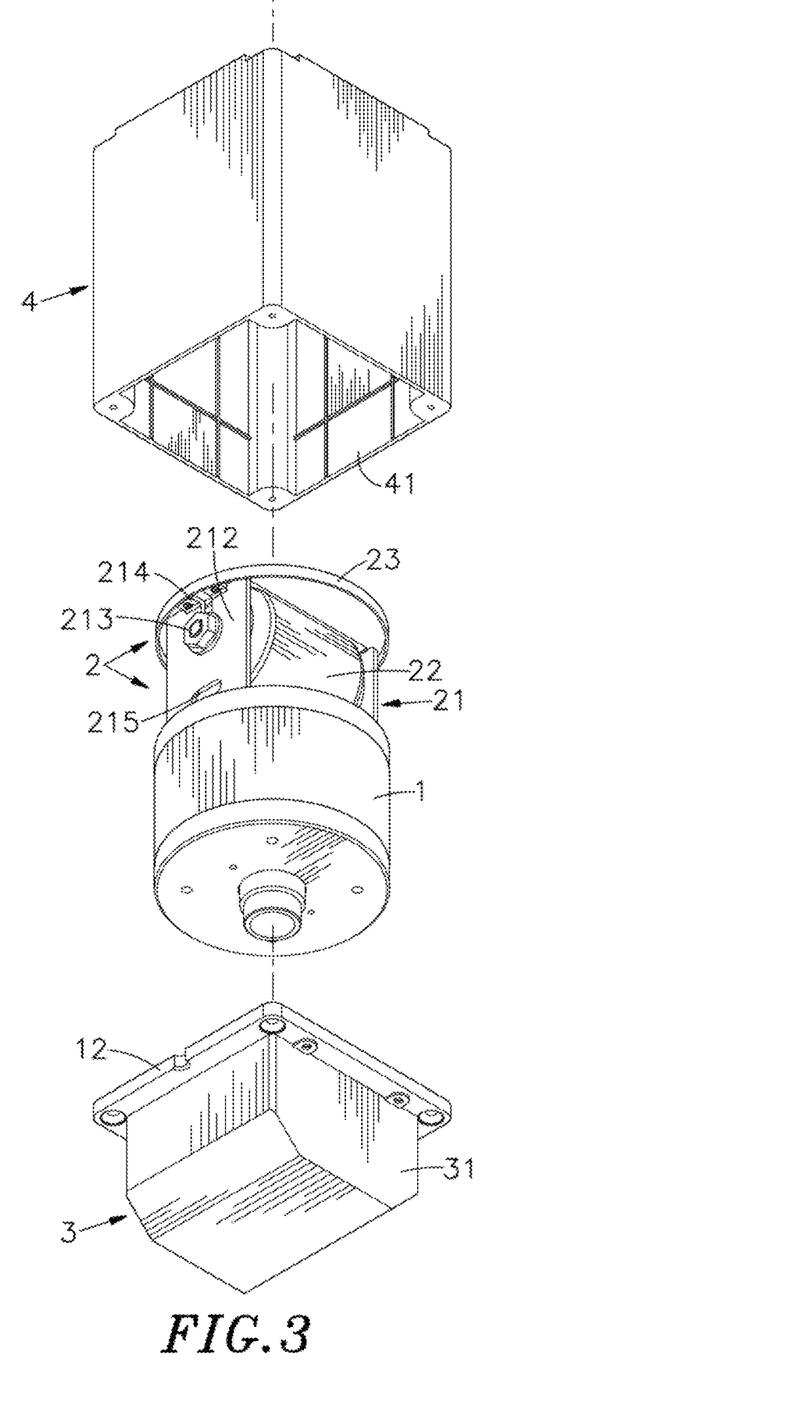
FIG. 3 is a perspective exploded view of a turning driving device of the present invention, when viewed from another angle.
Figure 4:
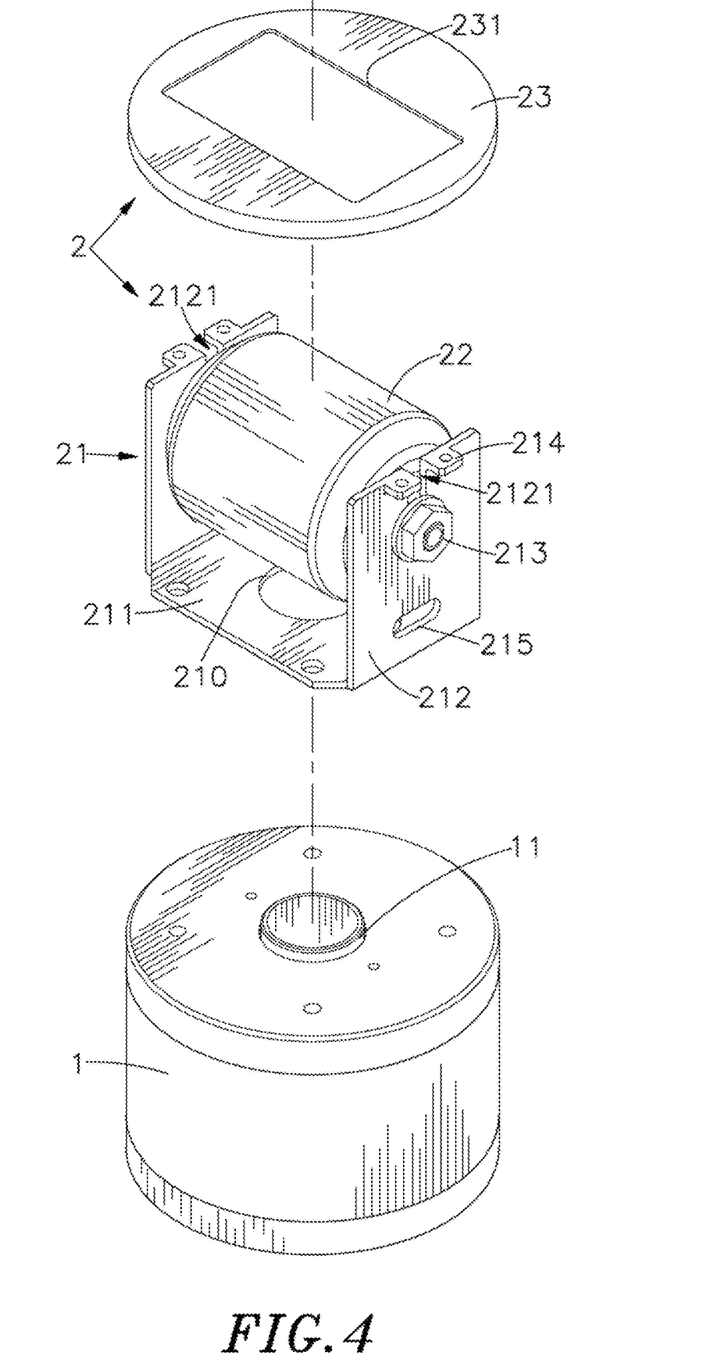
FIG. 4 is a perspective exploded view of a wheel hub motor module of the present invention.

Please refer to FIGS. 1 to 6, which are a perspective view of a turning driving device, a perspective exploded view of the turning driving device, an another perspective exploded view of the turning driving device when viewed from another angle, a perspective exploded view of a wheel hub motor module, another perspective exploded view of FIG. 4 when viewed from another angle, and a sectional side view of a turning driving device, according to the present invention. As shown in FIGS. 1 to 6, each turning driving device of the present invention applied in a conveying apparatus includes a directional motor 1, and a wheel hub motor module 2 and a driving device 3 disposed on and under the directional motor 1, respectively.

The directional motor 1 includes a rotation shaft 11 rotatable in a vertical direction, a rectangular base 12 combined with a bottom of a case of the directional motor 1, and the base 12 has a pass hole 121 formed on a central part thereof, and a lower part of the rotation shaft 11 is extended out of the case and through the pass hole 121 to combine with a shaft anti-drop component 111, so as to prevent the rotation shaft 11 from dropping during rotation. In an embodiment, the directional motor 1 can be a servo motor, a stepper motor or other motor capable of positioning a rotational angle thereof, and the rotation shaft 11 of the directional motor 1 is in a rotor structure, a stator structure is connected to a bracket or an end plate of the case to form a rotating part of the rotation shaft 11. In an embodiment, the rotation shaft 11 can be a hollow shaft, and the rotation shaft 11 has a through hole 112 formed on a lower part thereof, so that a cable connected to a control circuit can be inserted through the through hole 112 and out of the shaft. In an embodiment, the manner and function of controlling and detecting the motor driving status, for example, the manner of applying multiple Hall ICs or sensor control circuits to control the motor to rotate forwardly or backwardly, reset (that is, rotate to an original point), step to specified point and then apply fixed excitation, and the functions of activating buffer for motor protection, stopping buffer, activating overload protection, current limit protection or alarm, or emergently stopping motor, are well known conventional and optional technologies for the persons skilled in the art, so the details are not repeated herein, and various equivalent structural changes, alternations or modifications based on the descriptions and figures of present invention are all consequently viewed as being embraced by the spirit and the scope of the present invention set forth in the claims.

Figure 5:
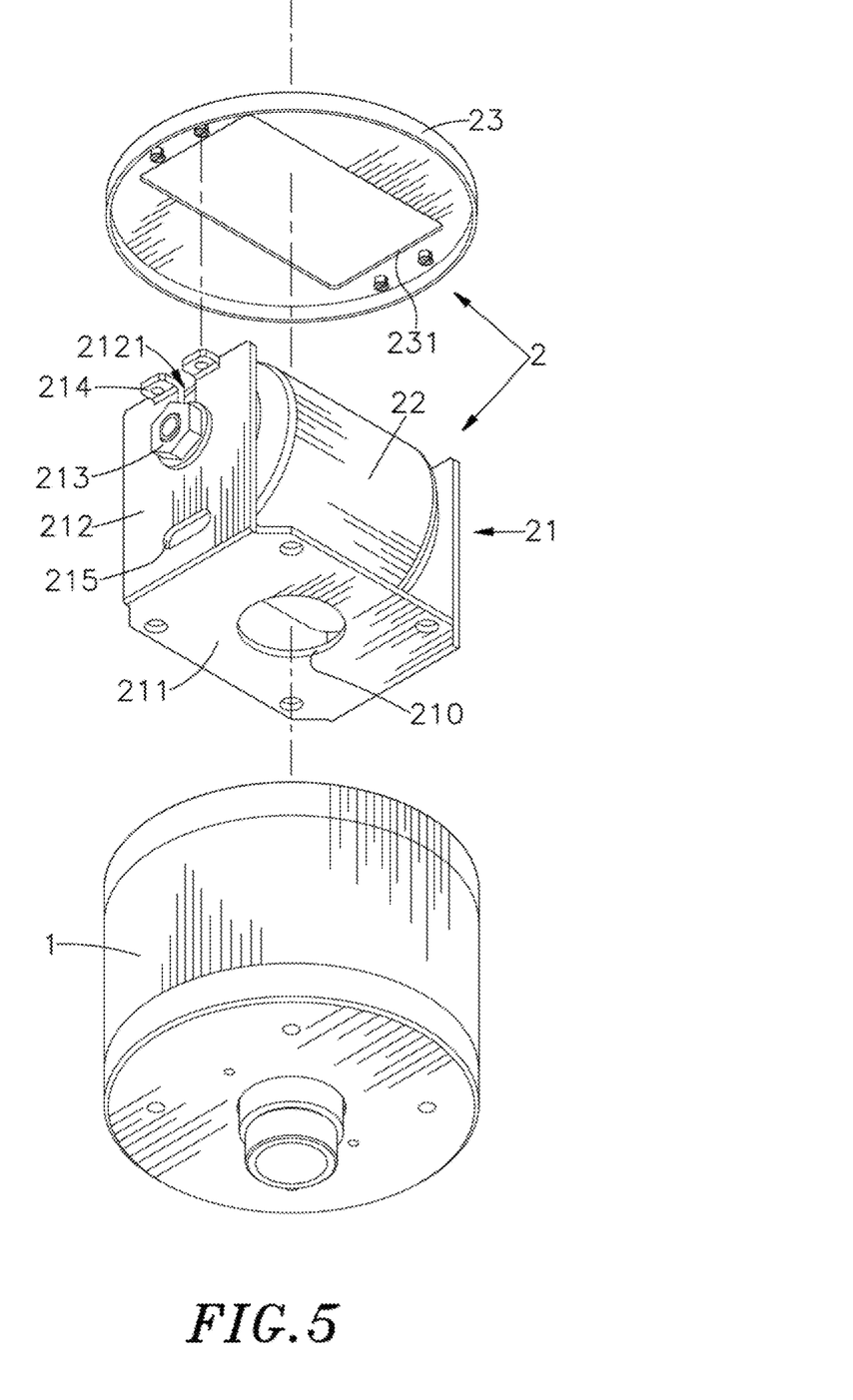
FIG. 5 is a perspective exploded view of FIG. 4 of the present invention, when viewed from another angle.
Figure 6:
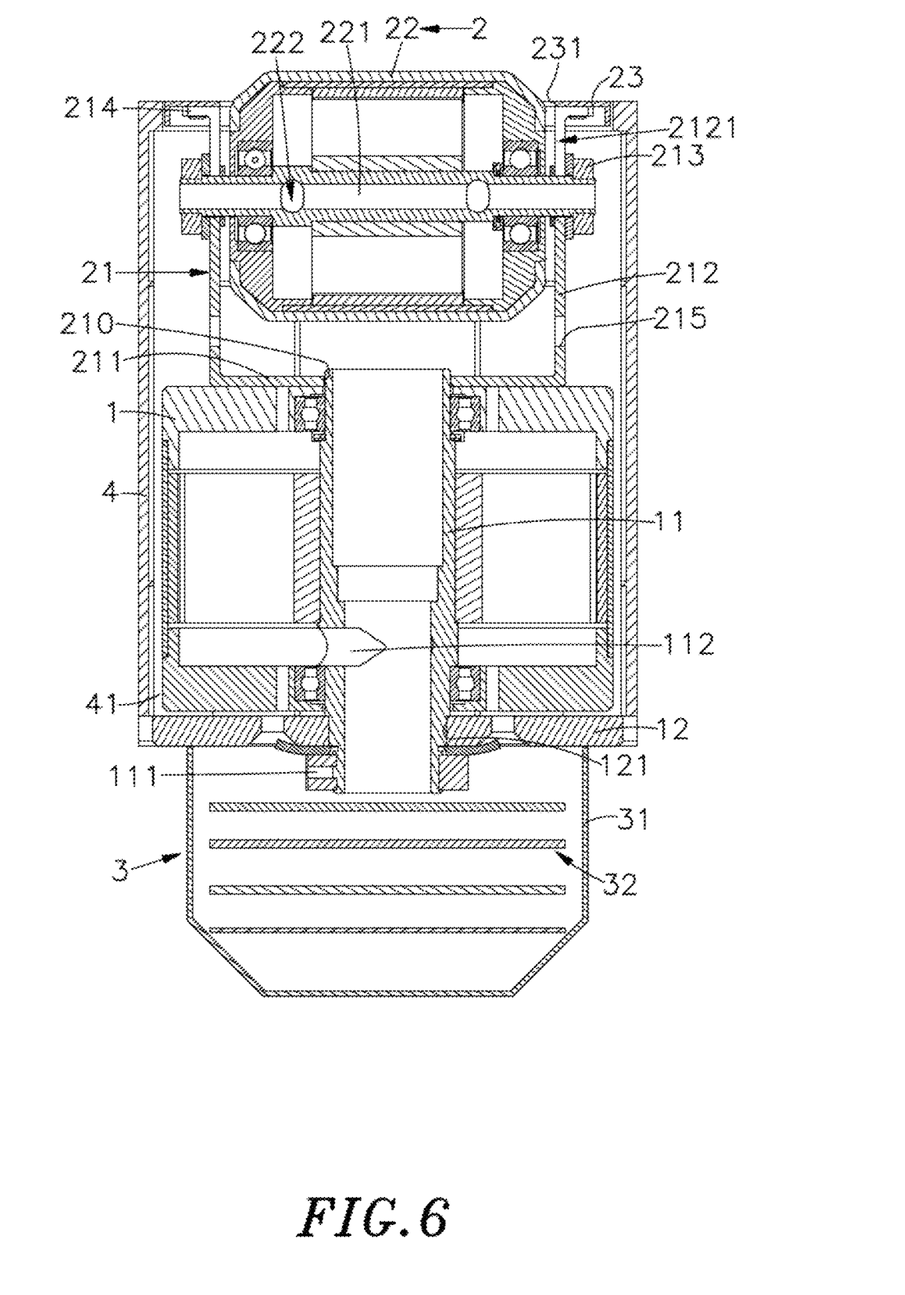
FIG. 6 is a sectional side view of a turning driving device of the present invention.
Figure 7:
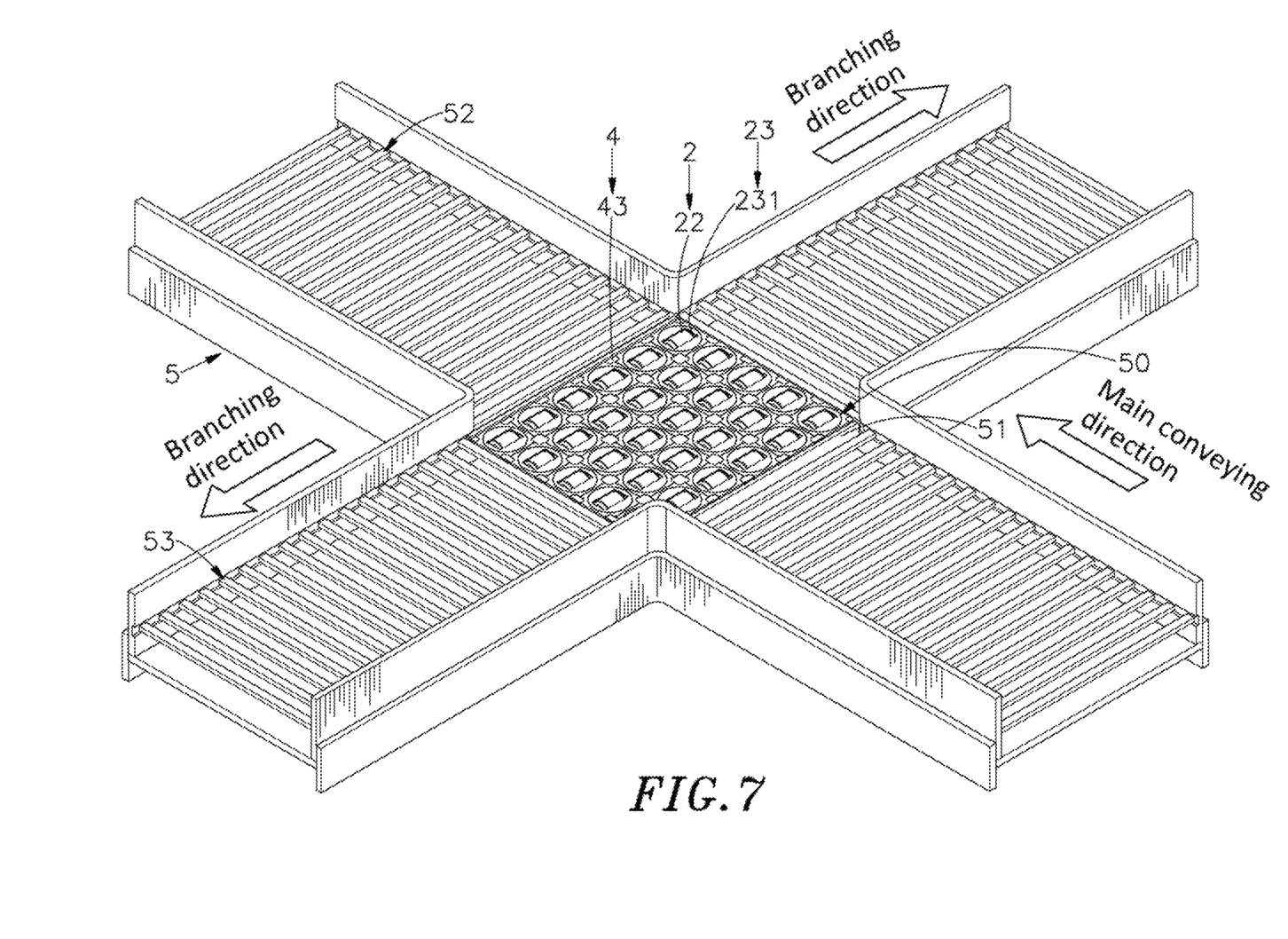
FIG. 7 is a perspective view of turning driving devices installed on a conveying platform of a conveying apparatus, according to a preferred embodiment of the present invention.

The wheel hub motor module 2 is disposed on the case of the directional motor 1, and includes a fixing frame 21, and at least one roller 22 rotatable about a horizontal fixed axle 221, and a dust-proof cover 23 combined on the fixing frame 21. In a preferred embodiment, the roller 22 and the fixed axle 221 form a wheel hub motor, and the wheel hub motor used in this embodiment is a known technology. The roller 22 of the wheel hub motor is connected to the case to form a rotor structure, and the fixed axle 221 surrounded by the central part of the roller 22 has two ends mounted on the fixing frame 21 to form the stator structure configured to provide the roller 22 to rotate. In an embodiment, the fixed axle 221 can be a hollow axle, and the fixed axle 221 has a through hole 222 formed on a side thereof, so that a cable connected to a control circuit can be inserted through the through hole 112 and out of the axle.

The operation of an outer rotor, in which a rotor is located on an outer ring, of the wheel hub motor module 2 is opposite to the operation of an inner rotor, in which a rotor is located on an inner ring, of the directional motor 1, and the manners and functions of driving and controlling the wheel hub motor and detecting status of the wheel hub motor, for example, the manners of applying multiple Hall ICs or sensor control circuits to drive the motor to rotate forwardly or backwardly, stop or control speed of the motor, and the functions of activating buffer for motor protection, stopping buffer, activating overload protection, current limit protection or alarm, or emergently stopping the motor, are well known and optional technology for the persons skilled in the art.

Furthermore, the wheel hub motor is also called an in-wheel motor in the industry, and the detail description is not repeated herein. Various equivalent structural changes, alternations or modifications based on the descriptions and figures of present invention are all consequently viewed as being embraced by the spirit and the scope of the present invention set forth in the claims.

As shown in FIGS. 4 and 5, the fixing frame 21 includes a bottom plate 211 disposed a bottom thereof, a fixing hole 210 formed on a central part of the bottom plate 211 and configured to combine with the rotation shaft 11, two side plates 212 upwardly extended from two sides of the bottom plate 211, shaft locking components 213 respectively disposed on the two side plates 212, and fixing plates 214 respectively bent from the top edges of the two side plates 212. Each side plate 212 has a locating hole 2121, and a hole 215 formed below the locating hole 2121 and configured to pass the cable of the wheel hub motor. The two ends of the fixed axle 221 surrounded by the center of the roller 22 are respectively mounted in the locating holes 2121 through the shaft locking components 213, to make the outer top surface of the roller 22 higher than the top of each side plate 212, so that the roller 22 can be exposed to drive the article, which place on the top of the roller 22, to move. The dust-proof cover 23 is combined on the fixing frame 21 through the fixing plates 214, and the dust-proof cover 23 has an exposure hole 231 formed on a surface thereof and configured to expose the outer surface of the roller 22. In an embodiment, the dust-proof cover 23 can be designed as a structure covering the outer side of the fixing frame 21 and exposing a part of the roller 22; in an embodiment, the dust-proof cover 23 can be omitted or be formed integrally with the fixing frame 21, and various equivalent structural changes, alternations or modifications based on the descriptions and figures of present invention are all consequently viewed as being embraced by the spirit and the scope of the present invention set forth in the claims.

The driving device 3 is disposed under the directional motor 1, and the driving device 3 includes a motor control box 31 combined with the bottom of the base 12, and a control module 32 mounted inside the motor control box 31. In an embodiment, the control module 32 can be a DC brushless motor driver board or a controller. The control module 32 is electrically connected to the directional motor 1 and the control circuit of the wheel hub motor module 2 through the cable which passes through the rotation shaft 11 and the fixed axle 221, so that the external power source can be connected to the driving device 3 to supply power, and the driving device 3 can control the rotation shaft 11 and the roller 22 to rotate.

As shown in FIGS. 2 and 3, the outer sides of the directional motor 1 and the wheel hub motor module 2 are covered by a hollow rectangular quick release motor housing 4, and the quick release motor housing 4 has an accommodation hole 40 formed on a top thereof and configure to expose the dust-proof cover 23, and an opening 41 formed on a bottom thereof and configured to combine with the top of the base 12, so that the quick release motor housing 4 can be combined with the directional motor 1, the wheel hub motor module 2 and the driving device 3 to form a single modularized installation kit.

The rotation shaft 11 of the directional motor 1 is fixed in the fixing hole 210 of the bottom plate 211 on the fixing frame 21 of the wheel hub motor module 2, the fixed axle 221 of the roller 22 is mounted between the two side plates 212, and the dust-proof cover 23 is combined on the fixing frame 21, so that a part of the outer surface of the roller 22 is exposed out of the exposure hole 231. The directional motor 1 and the driving device 3 are electrically connected to the control module 32 of the driving device 3 via cables, so that the directional motor 1 of the turning driving device of the present invention is able to drive the wheel hub motor module 2 to turn, and the wheel hub motor module 2 is able to drive the roller 22 to vertically rotate about the horizontal fixed axle 221.

In a preferred embodiment, the directional motor 1 and the wheel hub motor module 2 are electrically connected to the control module 32 of the driving device 3 through cables, respectively, but the present invention is not limited to this embodiment. For example, a first connection end can be disposed below the rotation shaft 11 of the wheel hub motor module 2 and configured to connect the cable, and a second connection end can be disposed on the motor control box 31; preferably, the first connection end and the second connection end can be implemented by a pin-type plug and a socket connector which are connected to or detached from each other to form a detachable electrical connection between the directional motor 1, the wheel hub motor module 2 and the driving device 3. In an embodiment, a cable connector or a general edge connector of a circuit board can be directly inserted into a corresponding connector on the motor driver board or a connector of the controller, so as to form electrical connection. In an embodiment, an anti-mistaking locating structure can be used to provide anti-mistaking locating effect in the mated connection process. Various equivalent structural changes, alternations or modifications based on the descriptions and figures of present invention are all consequently viewed as being embraced by the spirit and the scope of the present invention set forth in the claims.

Please refer to FIGS. 7 to 10, which are a perspective view of turning driving devices installed on the conveying platform of the conveying apparatus according to a preferred embodiment, a perspective view of single turning driving device detached or installed according to the preferred embodiment, a schematic view showing that turning driving devices drive an article to move toward the predetermined direction according to other preferred embodiment, and a schematic view showing that turning driving devices drive an article to move toward the predetermined direction according to another preferred embodiment. The turning driving devices are applied to the conveying apparatus, the conveying apparatus includes a conveying platform 5, a mounting frame 51 disposed at a turning point or a branching point 50 on the article conveying path of the conveying platform 5, the turning driving devices disposed side by side on the mounting frame 51, a main conveyor 52 disposed on the conveying platform 5 in the main conveying direction of the article conveying path, and a branch conveyor 53 disposed in a branching direction of the article conveying path.

Figure 8:
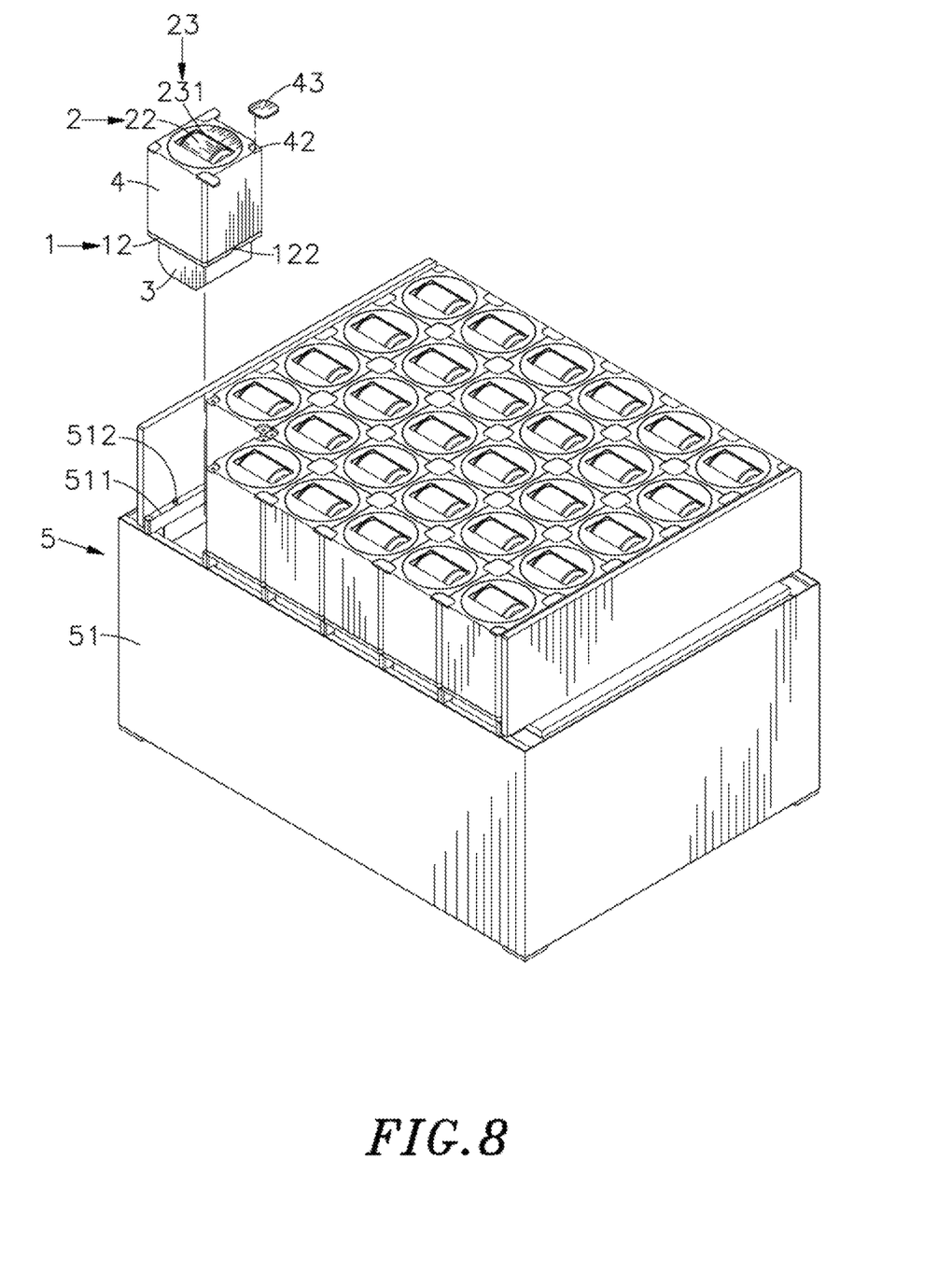
FIG. 8 is a perspective view showing an operation of detaching or installing single turning driving device, according to a preferred embodiment of the present invention.

As shown in FIG. 8, in the conveying platform 5 of this embodiment, the mounting frame 51 includes a plurality of crossbars 511 disposed thereon and arranged in interval, and a plurality of locating pins 512 respectively protruded on the crossbars 511. The base 12 of the directional motor 1 has constraint holes 122 inwardly recessed on two opposite sides thereof, and the quick release motor housing 4 has fastening grooves 42 formed on corners thereof, respectively, so that each turning driving device can be installed between two adjacent crossbars 511, and two opposite sides of the base 12 of the directional motor 1 can be placed on and across two adjacent crossbars 511. After the constraint holes 122 on two opposite sides of the base 12 are respectively engaged with the locating pins 512 on the two adjacent crossbars 511, the fastening grooves 42 of the adjacent two quick release motor housings 4 can be respectively combined with joint members 43, so that the plurality of turning driving devices are arranged side by side to form an array or a geometry arrangement assembly with different amount of the plurality of turning driving devices or in a predetermined shape.

When the present invention is in use, the main conveyor 52 of the conveying platform 5 uses a conveyor or a roller to convey articles to move toward the main conveying direction in sequential order, and when the article has entered or not entered the position of the turning point or the branching point 50, the control module 32 of the driving device 3 in each turning driving device can respectively output and transmit the control signals to the directional motor 1 and the wheel hub motor module 2 through cables. When the control circuit of the directional motor 1 receives rotational angle information contained in the control signal, the control circuit drives the rotation shaft 11 to further drive the fixing frame 21, so that the wheel hub motor module 2 is horizontally turned to the preset angular position stably, for example, the wheel hub motor module 2 is driven to turn leftwardly or rightwardly (such as in a range between −180 degrees to 180 degrees) from an original point, which is 0 degree and means the straight movement direction. After the control circuit of the wheel hub motor module 2 receives the rotational angle information contained in the control signal, the control circuit drives the roller 22 to vertically rotate about the fixed axle 221, so that the article placed on the roller 22 is driven to continuously move toward the branch conveyor 53 in the predetermined direction or the branching direction, to reach a predetermined position along the preset path, and the sorting or classifying operation can be quickly completed. The directional motor 1 of each turning driving device can drive the rotation shaft 11 to individually turn the wheel hub motor module 2 placed thereon to the preset angular position, so that the turning angle is not limited; furthermore, the wheel hub motor module 2 can drive the roller 22 to directly move the article, so that the plurality of turning driving devices can be arranged side by side to form an array or geometric arrangement assembly to guide the article to quickly move toward the desired predetermined direction.

According to the above-mentioned contents, the key technical concept of the present invention is that the plurality of turning driving devices are arranged side by side at the branching point 50 of the conveying platform 5 in the conveying apparatus, and each turning driving device can use the directional motor 1 to receive the rotational angle information contained in the control signal outputted by the driving device 3, and use the rotation shaft 11 to drive the fixing frame 21 to horizontally turn the wheel hub motor module 2 to the preset angular position. Furthermore, since the directional motor 1 is activated only for the turning operation of the wheel hub motor module 2, the usage rate of the directional motor 1 is lower, and the directional motor 1 can turn to the specified angular position without cooperating with complex mechanism for the turning operation, it is not easy to cause damage to the motor or mechanism, and the service life of the whole device can be extended.

Figure 9:
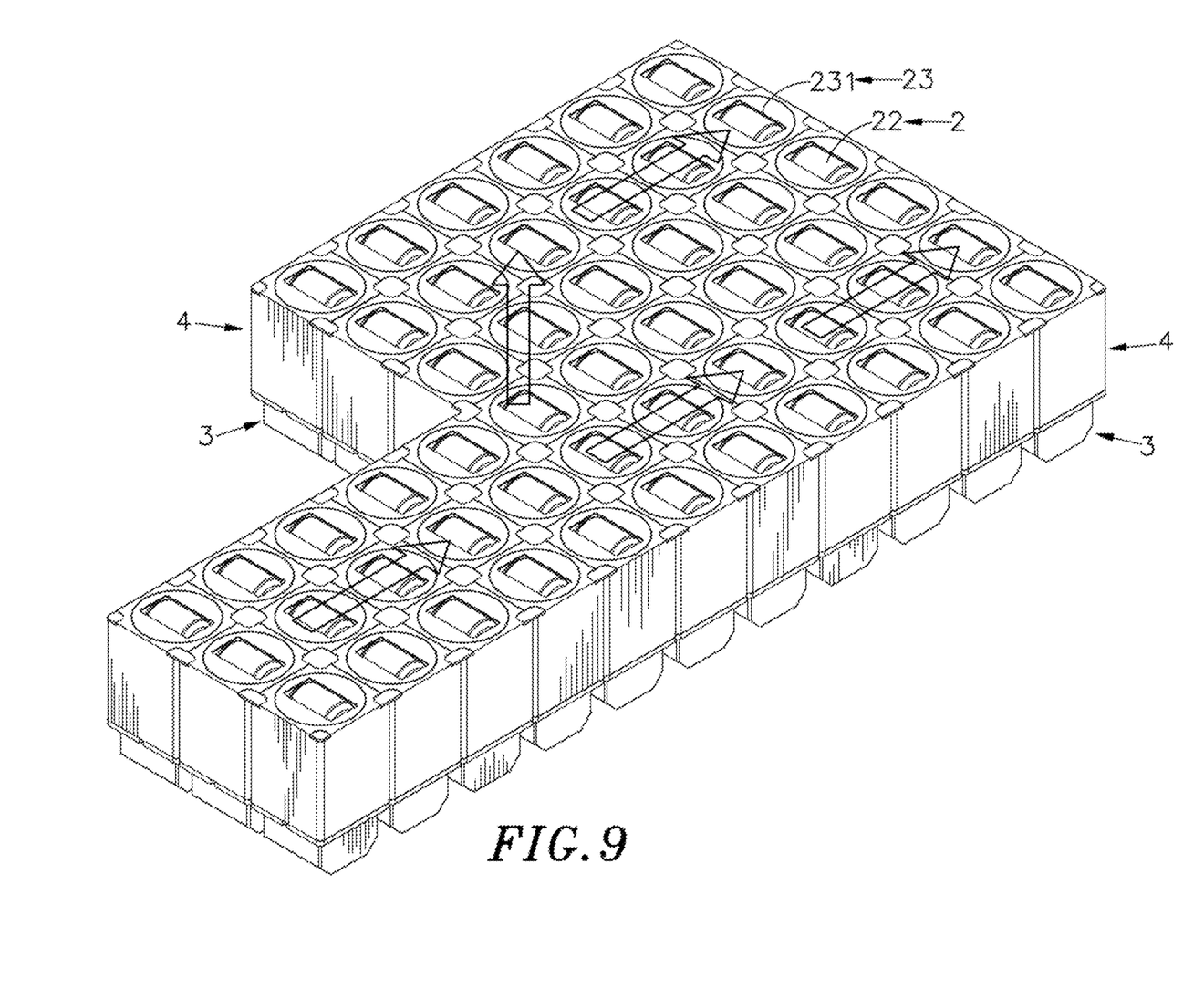
FIG. 9 is a schematic view showing that turning driving devices drive an article to move toward a predetermined direction, according to other preferred embodiment of the present invention.
Figure 10:
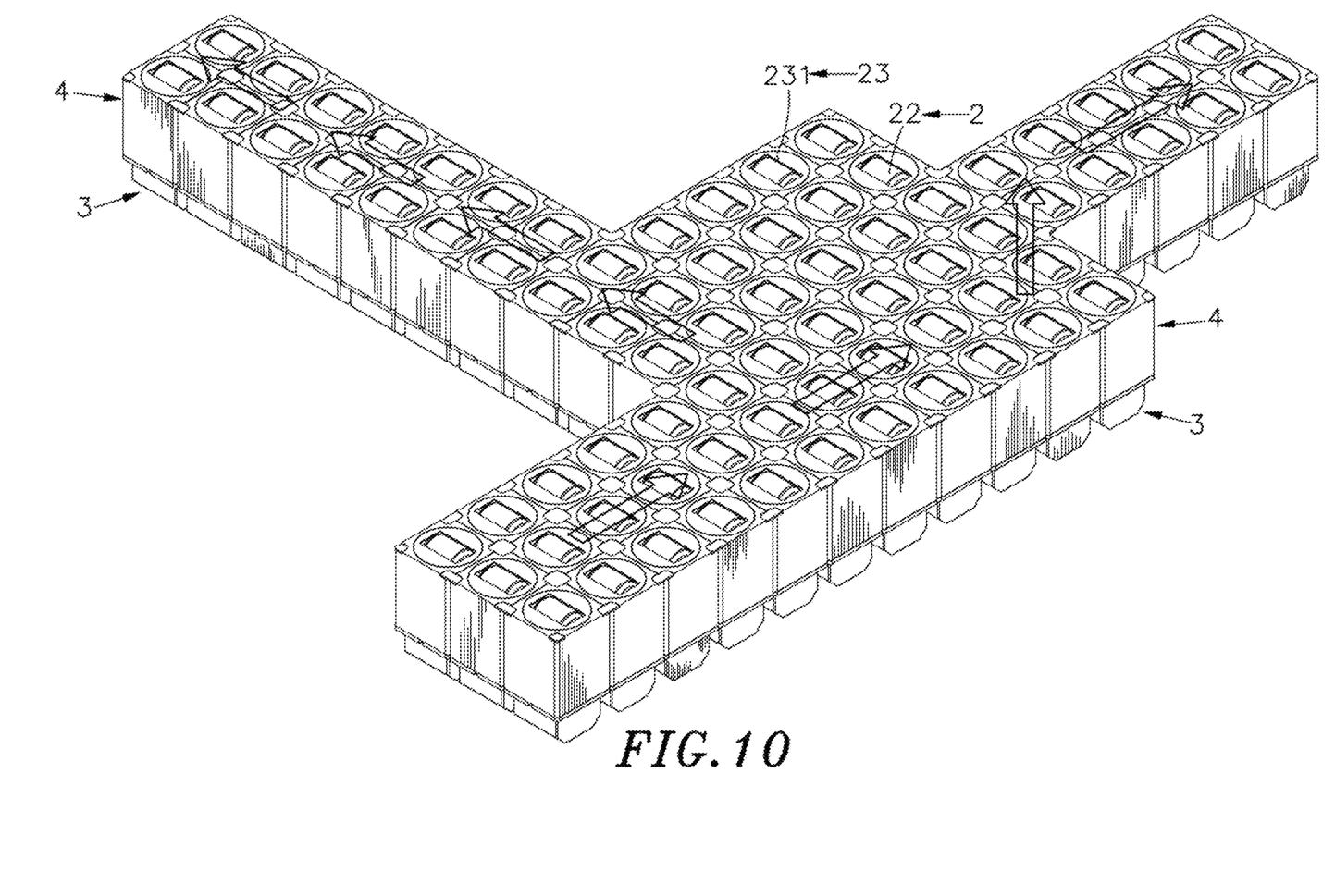
FIG. 10 is a schematic view showing that turning driving devices drive an article to move toward a predetermined direction, according to another preferred embodiment of the present invention.

Furthermore, the wheel hub motor module 2 of each turning driving device has advantages of low rotation speed, high torque and high efficiency, and the wheel hub motor module 2 can receive the control signal outputted from the driving device 3 and drive the roller 22 to directly guide the article correctly to move toward the predetermined direction quickly. When being applied to the different conveying apparatus, the turning driving devices can be increased or decreased upon the conveying path plan or the sizes, different weights and different amounts of the articles to be conveyed, and the plurality of turning driving devices can be arranged side by side to form an array or a geometry arrangement assembly with different amount of the plurality of turning driving devices or in a predetermined shape. For example, FIG. 8 shows a standard conveying apparatus having 30 turning driving devices arranged side by side as a rectangular array, and FIGS. 9 to 10 show the conveying apparatus having additional turning driving devices assembled with the standard conveying apparatus to form an arrangement assembly with a different amount of turning driving devices or in a different shape, so as to meet the shape, angle or path (such as the turning point or the branching point 50) of different conveying platform 5 in use. As a result, the present invention can provide wide applicability.

As shown in FIG. 8, when the control end (such as a central control system) detects that the motor of any one turning driving device is in an abnormal status, the control end outputs a warning message to notify an administrator to start the repair process in time, and in the repair, replacement or maintenance operation, the site operator just needs to remove the joint members 43 from the quick release motor housing 4 and then upwardly pulls out the quick release motor housing 4 with the directional motor 1, the wheel hub motor module 2 and the driving device 3 conveniently, to separate the constraint hole 122 of the base 12 from the locating pin 512 of the mounting frame 51, and the site operator can then install another normal turning driving device at the position, where the abnormal turning driving device is removed, on the conveying platform 5, and the removed turning driving device can be repaired or maintained. In this way, each turning driving devices is designed as a single modularized installation kit which can be quickly detached or replaced, so that the period of stopping or interrupting the production line greatly shortened, and as a result, in the era of automated production in unmanned factories, maintenance operation can be completed in a very short time, and the present invention can provide effects of simple structure, small overall assembly space, simple maintenance and low cost.

Figure 11:
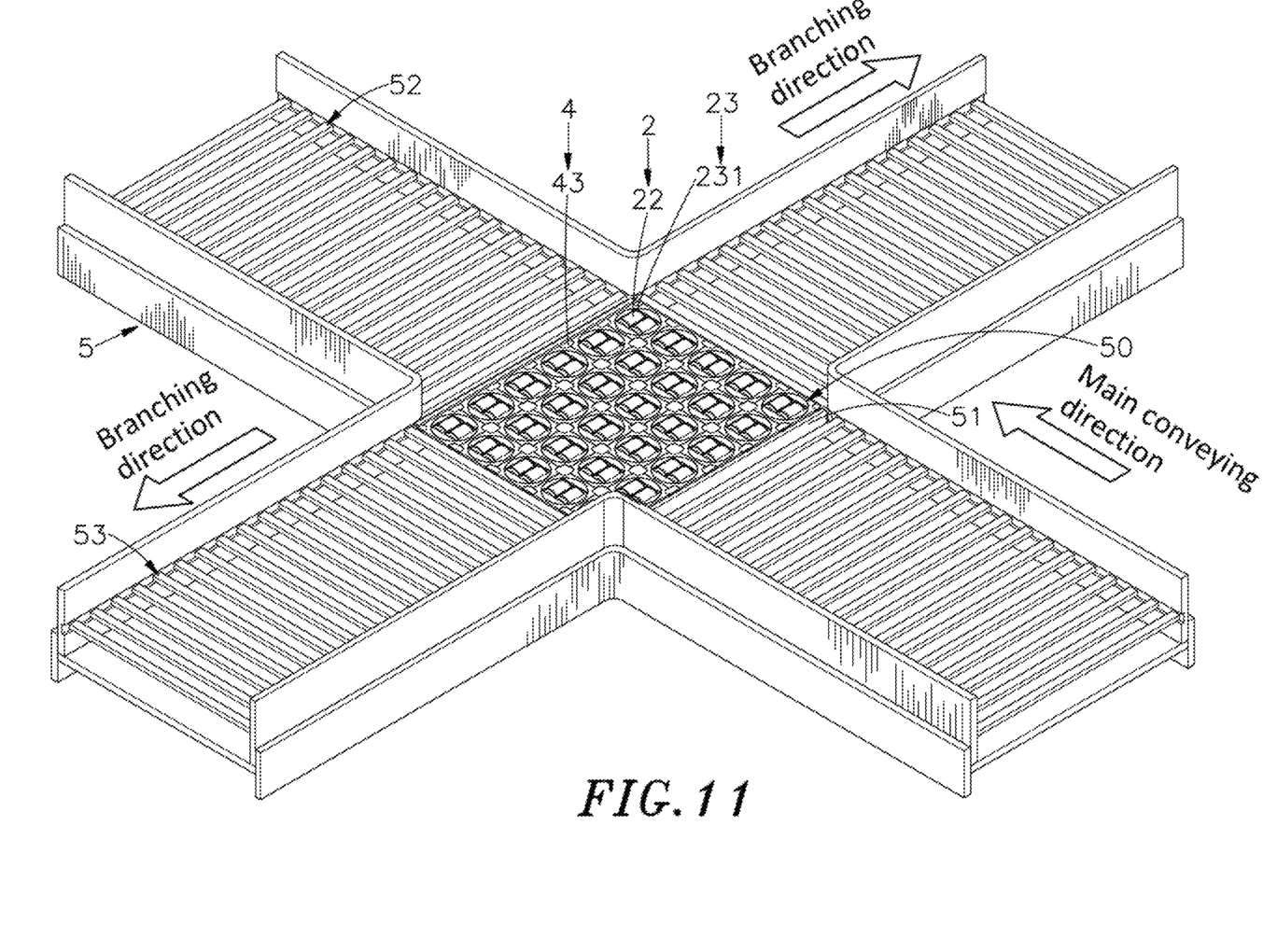
FIG. 11 is a perspective view of turning driving devices installed on a conveying platform of a conveying apparatus, according to another preferred embodiment of the present invention.
Figure 12:
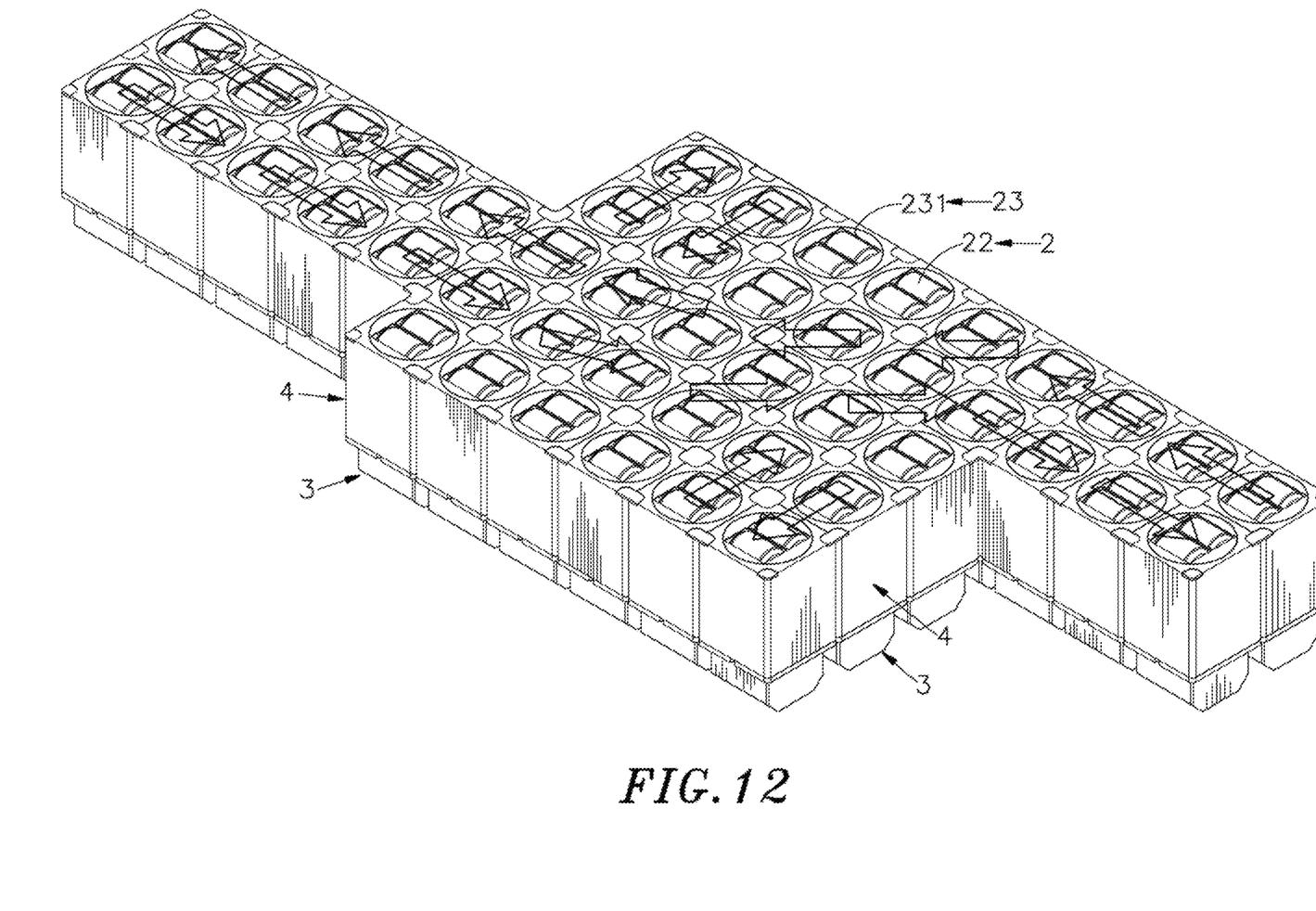
FIG. 12 is a schematic view showing that turning driving devices drive an article to move toward a predetermined direction, according to another preferred embodiment of the present invention.

Please refer to FIGS. 11 to 12, which are a perspective view of turning driving devices installed on a conveying platform of a conveying apparatus according to another preferred embodiment, and a schematic view showing that turning driving devices drive the article to move toward the predetermined direction, according to another preferred embodiment. According to the preferred embodiment of the present invention shown in FIGS. 11 and 12, the wheel hub motor module 2 of the turning driving device includes the roller 22 rotatable about the horizontal fixed axle 221, and another roller 22 rotatable about the horizontal fixed axle 221; two ends of the fixed axle 221, which is surrounded by the central parts of the two rollers 22, are combined in the locating hole 2121 on the two side plates 212 of the fixing frame 21, respectively. A part of the outer surface of each of the two rollers 22 is exposed out of the exposure hole 231 of the dust-proof cover 23 and the two rollers 22 are rotated synchronously, respectively. Various equivalent structural changes, alternations or modifications based on the descriptions and figures of present invention are all consequently viewed as being embraced by the spirit and the scope of the present invention set forth in the claims.

Furthermore, when the above-mentioned turning driving device of the present invention is installed at the branching point 50 of the conveying platform 5 in the conveying apparatus, multiple turning driving devices can be arranged side by side to form an array or a geometry arrangement assembly with different amount of the plurality of turning driving devices or in a predetermined shape, and the driving device 3 of each turning driving device drives the directional motor 1 to drive the wheel hub motor module 2 to turn horizontally to the preset angular position, and the two rollers 22 of the wheel hub motor module 2 rotate synchronously to guide the article to move quickly toward the predetermined direction, so that design using the two rollers 22 improves an output force to carry a heavier article and is not easy to cause damage to the motor or mechanism.

The present invention disclosed herein has been described by means of specific embodiments. However, numerous modifications, variations and enhancements can be made thereto by those skilled in the art without departing from the spirit and scope of the disclosure set forth in the claims.

What is claimed is:

1. A sorting system for a conveying apparatus, wherein the conveying apparatus comprises a conveying platform, a plurality of turning driving devices disposed side by side on a position of a turning point or a branching point on an article conveying path of the conveying platform, and each of the plurality of turning driving devices comprises:

a directional motor comprising a rotation shaft rotatable about a vertical axis;

a wheel hub motor module disposed on the directional motor and comprising at least one roller configured to rotate about a horizontal fixed axle, a fixing frame configured for the horizontal fixed axle to be mounted thereon, wherein a bottom of the fixing frame is combined with the rotation shaft; and a driving device disposed under the directional motor and comprising a control module, wherein the control module is electrically connected to the directional motor and the wheel hub motor module, and configured to supply power to and control the rotation shaft and the roller to rotate, and when the control module outputs and transmits control signals to the directional motor and the wheel hub motor module, respectively, the rotation shaft of the directional motor drives the fixing frame of the wheel hub motor module to horizontally turn to a preset angular position, and the wheel hub motor module drives the roller to vertically rotate, so as to drive the article placed thereon to move toward a predetermined direction, wherein the conveying platform comprises a mounting frame disposed on the position of the branching point, and the plurality of turning driving devices are disposed side by side on the mounting frame to form an assembly with different amount of the plurality of turning driving devices, the sorting system for conveying apparatus further comprises a base, wherein a bottom of the directional motor is combined with the base, and a bottom of the base is combined with a motor control box of the driving device, and the motor control box comprises the control module mounted therein, and the mounting frame of the conveying platform comprises a plurality of crossbar arranged at intervals, and the plurality of turning driving devices are respectively arranged side by side between adjacent two of the plurality of crossbars, to form a rectangular array, and the directional motor and the wheel hub motor module are covered by a quick release motor housing, and the quick release motor housing has fastening grooves respectively formed on corners of a top part thereof, and at least one joint member is configured to fasten in the fastening grooves of the two adjacent quick release motor housings to combine the two adjacent quick release motor housings with each other.

2. The sorting system for conveying apparatus according to claim 1, wherein each of the plurality of crossbars of the mounting frame has a plurality of locating pins protruded on a top thereof, and the base of the directional motor has constraint holes inwardly recessed on two opposite sides thereof and configured to engage with the plurality of locating pins, respectively.

3. The sorting system for conveying apparatus according to claim 1, wherein the conveying platform comprises a main conveyor disposed thereon in a main conveying direction of the article conveying path, and a branch conveyor disposed thereon in a branching direction of the article conveying path.

\* \* \* \* \*